M. J. FITZGERALD.
NUT LOCK.
APPLICATION FILED FEB. 3, 1913.
1,085,080.
Patented Jan. 20, 1914.
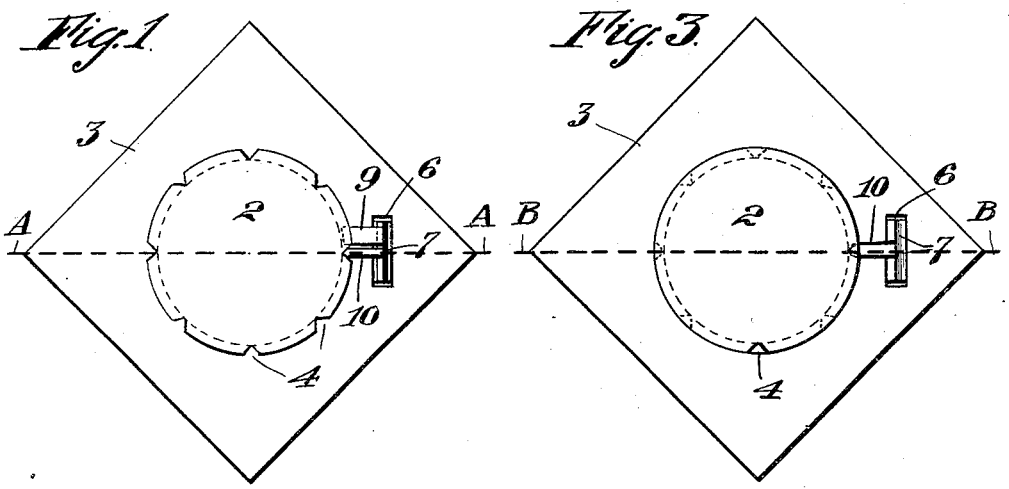
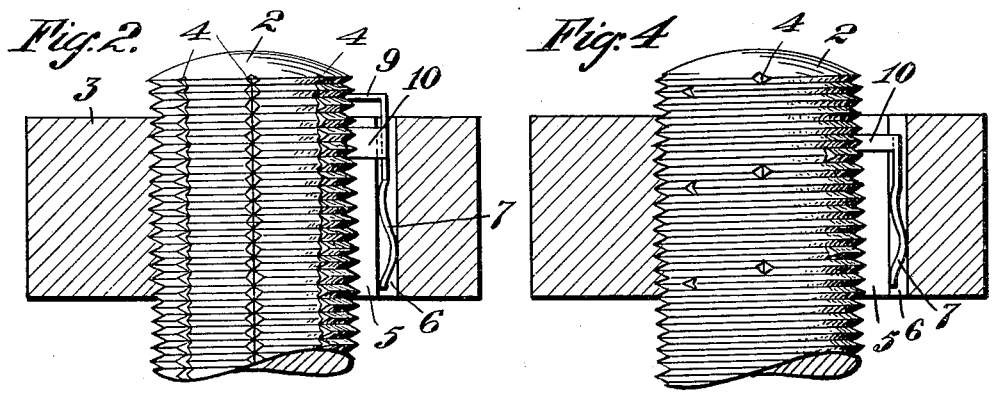
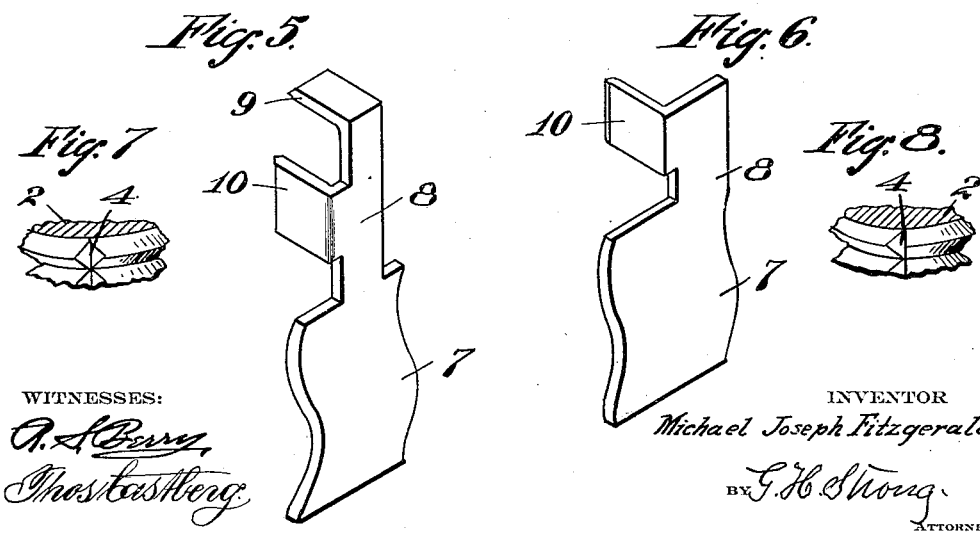
WITNESSES:
INVENTOR
Michael Joseph Fitzgerald
BY G. H. Strong
ATTORNEY

UNITED STATES PATENT OFFICE.

MICHAEL JOSEPH FITZGERALD, OF RICHMOND, CALIFORNIA, ASSIGNOR OF ONE-TENTH TO CHARLES H. BROWN, OF RICHMOND, CALIFORNIA.

NUT-LOCK.

1,085,080.          Specification of Letters Patent.      Patented Jan. 20, 1914.

Application filed February 3, 1913. Serial No. 745,955.

*To all whom it may concern:*

Be it known that I, MICHAEL JOSEPH FITZGERALD, a citizen of the United States, residing at Richmond, in the county of Contra Costa and State of California, have invented new and useful Improvements in Nut-Locks, of which the following is a specification.

This invention relates to a lock nut.

It is the object of this invention to provide a device, by means of which a nut can be effectively locked on a threaded bolt or stud against accidental loosening, and which is adapted to be detached from the nut to permit the latter to be readily removed.

Another object is to provide a nut lock which is simple in construction, economical, and by means of which a nut may be securely locked in place on a threaded bolt without damaging either the nut or bolt, and which will permit of the nut being removed and replaced whenever desired without destroying the threads.

The invention primarily resides in forming a T-slot on the inside of the nut, forming notches in the screw-threads of the bolt, and mounting a spring member of peculiar construction in the T-slot which is adapted to engage the notches in the threads of the bolt to lock the nut and bolt together against rotation with relation to each other.

The invention further consists of the parts and the construction and combination of parts as hereinafter more fully described and claimed, having reference to the accompanying drawings, in which—

Figure 1 is a plan view of a nut and bolt showing the invention as applied. Fig. 2 is a vertical section on the line A—A of Fig. 1 partly in elevation. Fig. 3 is a plan view of a nut and bolt, showing a modified form of the invention. Fig. 4 is a vertical section on the line B—B of Fig. 3 partly in elevation. Fig. 5 is a perspective view of the catch employed in the form of the invention shown in Figs. 1 and 2. Fig. 6 is a similar view of the catch employed in the form of the invention shown in Figs. 3 and 4. Fig. 7 is a detail in perspective of the notch formed in the bolt thread. Fig. 8 is a similar view of a modified form.

In the drawings, 2 indicates the threaded portion of a bolt, stud or similar article, and 3 represents a nut which is adapted to be screwed on the threaded end of the bolt 2; the bolt 2 and nut 3 being of the common well-known variety.

Formed in the threads of the bolt 2 is a series of notches 4, of any suitable shape, which may have inclined sides in the form of a V, as shown in Fig. 7, or one vertical side, as shown in Fig. 8. The notches 4 may be arranged in any desired manner, being shown in Figs. 1 and 2 as formed by cutting grooves lengthwise of the bolt at suitable intervals around its periphery, thus forming a series of alined notches in the adjacent threads, and are shown in Figs. 3 and 4 as being cut at intervals in the threads so as to be disposed in spiral arrangement around the bolt.

The nut 3 is formed with a slot or groove 5 on its inner face, which slot extends transversely of the threads in the nut and opens to a slot or channel 6 extending at right angles thereto; the slots 5 and 6 forming a single slot in the shape of a T, which, for convenience in manufacture, extends entirely through the nut. Detachably mounted in the T-shaped slot is a plate spring member of special configuration and which varys in its design according to whether the notches 4 are arranged in rows or in spiral arrangement on the bolt 2. When the notches 4 are arranged in alinement, as shown in Fig. 2, the spring plate is formed as shown in Fig. 5; that is, with a crimped or bent portion 7 having an upwardly extending portion or stem 8 terminating at its upper end in a horizontal projection or tongue 9 and formed with a vertical, inwardly protruding member or flange 10 on the stem 8.

In the form shown in Fig. 6, which is employed when the notches 4 are spirally arranged, the tongue 9 is eliminated; the remainder of the spring member being substantially the same as that shown in Fig. 5.

The crimped portion 7 of the spring plate is designed to be introduced into the slot 6 in the nut 3 so as to extend transversely of the slot 5, with the flange member 10 projecting through the slot 5 and with its outer end bearing against the threads on the bolt 2. The crimped portion 7 of the plate forms a spring which acts to temporarily bind the plate in the nut and to normally retain the flange 10 against the threads of the bolt under pressure in such a manner that, when the outer edge of the flange is positioned over a notch 4, it will spring therein and thus hold the nut against turning, except when sufficient rotating force is applied to the nut to cause the flange to ride over the beveled edges of the notches. The tongue 9 is designed to engage the threads of the bolt, as shown in Figs. 1 and 2, to retain the plate in position in the nut 3 and prevent it from falling out of the slots 5 and 6. Where the notches 4 are staggered the flange 10 is positioned between the unnotched threads which serve to hold the plate in position. By inserting a suitable tool under the tongue 9, the stem portion 8 of the spring plate may be retracted so as to withdraw the flange 10 and tongue 9 out of engagement with the threads of the bolt and permit of the spring plate being entirely withdrawn, so that the nut may be unscrewed and removed from the bolt. The spring plate may be inserted in place in the nut either before or after the nut is screwed on the bolt and may be removed at any time, as before described.

By forming the notches 4 with both sides beveled, as shown in Fig. 7, the nut 3 may be turned in either direction by a suitable tool, when the locking flange 10 is engaged. The flange rides out of the notches when sufficient power is applied to the nut but will not disengage from the notch by vibration. If the notches 4 are formed with one straight side, as shown in Fig. 8, the nut may be turned in one direction by the use of a tool while the spring locking member is in place, but will be effectively locked against turning in the opposite or reverse direction until the locking flange 10 is withdrawn from the notch.

From the foregoing it will be seen that I have provided a nut lock which is simple, cheap, efficient and reliable, and which may be removed and replaced at will.

A particular advantage of this invention resides in the fact that it is possible to take up any slack, such as may be occasioned by wear of machinery, or extension of bolt, and if there is sufficient jar or vibration the nut will travel on the bolt and lock itself.

Having thus described my invention, what I claim and desire to secure by Letters Patent is—

1. In a nut locking device, a screw-threaded bolt having longitudinally disposed exterior grooves, a coacting nut having a T-slot made therein, a flat undulating spring fitting the head of the slot, and flanges formed at right angles thereto and projecting through the radial portion of the slot to engage the grooves and thread of the bolt.

2. A nut having a radial slot and a transverse connecting slot, a threaded bolt having exterior longitudinal grooves, an elastic spring having a reversely curved main portion fitting the transverse slot in the nut, and tongues projecting through the radial portion of the slot and engaging the grooves and threads of the bolt.

In testimony whereof I have hereunto set my hand in the presence of two subscribing witnesses.

MICHAEL JOSEPH FITZGERALD.

Witnesses:
W. W. HEALEY,
R. S. BERRY.

---

Copies of this patent may be obtained for five cents each, by addressing the "Commissioner of Patents, Washington, D. C."